(12) United States Patent
Sugie

(10) Patent No.: US 12,218,620 B2
(45) Date of Patent: Feb. 4, 2025

(54) MOTOR DRIVER CIRCUIT FOR LINEAR MOTOR, POSITIONING DEVICE USING THE SAME, AND HARD DISK DEVICE

(71) Applicant: ROHM CO., LTD., Kyoto (JP)

(72) Inventor: Hisashi Sugie, Kyoto (JP)

(73) Assignee: ROHM CO., LTD., Kyoto (JP)

( * ) Notice: Subject to any disclaimer, the term of this patent is extended or adjusted under 35 U.S.C. 154(b) by 160 days.

(21) Appl. No.: 17/979,305

(22) Filed: Nov. 2, 2022

(65) Prior Publication Data

US 2023/0147064 A1 May 11, 2023

(30) Foreign Application Priority Data

Nov. 10, 2021 (JP) ................. 2021-183533

(51) Int. Cl.
*H02P 7/025* (2016.01)
*G11B 19/20* (2006.01)
*H02P 7/292* (2016.01)

(52) U.S. Cl.
CPC .......... *H02P 7/025* (2016.02); *G11B 19/2036* (2013.01); *H02P 7/292* (2013.01)

(58) Field of Classification Search
CPC .. H02P 7/025; H02P 7/292; H02P 6/08; H02P 25/034; G11B 19/2036; G11B 5/5573
USPC ................................. 318/135, 687
See application file for complete search history.

(56) References Cited

U.S. PATENT DOCUMENTS

| | | | |
|---|---|---|---|
| 6,759,827 B2 * | 7/2004 | Kawashima | H02P 6/20 318/727 |
| 8,704,478 B2 * | 4/2014 | Arai | G11B 21/106 318/621 |
| 8,963,455 B2 * | 2/2015 | Kurosawa | H02P 25/028 318/560 |

FOREIGN PATENT DOCUMENTS

JP  2005304095 A  10/2005

* cited by examiner

*Primary Examiner* — David Luo
(74) *Attorney, Agent, or Firm* — CANTOR COLBURN LLP

(57) ABSTRACT

A motor driver circuit includes: an error detection amplifier configured to receive a current feedback signal indicating a drive current of a motor as an object to be driven and an analog command signal indicating a target amount of the drive current, and generate an analog error signal indicating an error between the drive current and the target amount of the drive current; an A/D converter configured to convert the analog error signal generated by the error detection amplifier into a digital error signal; a digital compensator configured to generate a digital control amount based on the digital error signal output by the A/D converter; a D/A converter configured to convert the digital control amount into an analog control signal; and an output stage configured to supply a drive signal according to the analog control signal to the motor.

11 Claims, 6 Drawing Sheets

MOTOR DRIVER CIRCUIT FOR LINEAR MOTOR, POSITIONING DEVICE USING THE SAME, AND HARD DISK DEVICE

CROSS-REFERENCE TO RELATED APPLICATION

The present invention claims priority under 35 U.S.C. § 119 to Japanese Application, 2021-183533, filed on Nov. 10, 2021, the entire contents of which being incorporated herein by reference.

TECHNICAL FIELD

The present disclosure relates to a driver circuit for a linear motor.

BACKGROUND

Linear motors (linear actuators) that position target objects are used in various electronic apparatuses and industrial machines. A voice coil motor is one of linear motors and can control a position of a mover according to a supplied drive current. A drive circuit for the voice coil motor feedback-controls a current flowing through the voice coil motor so as to approach a target current that defines a target position.

There are two types of driver circuits for motors that are driven by a constant current, i.e., analog type driver circuits and digital type driver circuits. Analog type driver circuits are difficult to design because they require phase compensation for an error amplifier.

On the other hand, digital type driver circuits require a high-bit A/D converter for converting a detected signal indicating a current flowing through a motor into a digital signal.

SUMMARY

Some embodiments of the present disclosure provide a digital type driver circuit that can employ a low-bit A/D converter.

According to one embodiment of the present disclosure, a motor driver circuit includes: an error detection amplifier configured to receive a current feedback signal indicating a drive current of a motor as an object to be driven and an analog command signal indicating a target amount of the drive current, and generate an analog error signal indicating an error between the drive current and the target amount of the drive current; an A/D converter configured to convert the analog error signal generated by the error detection amplifier into a digital error signal; a digital compensator configured to generate a digital control amount based on the digital error signal output by the A/D converter; a D/A converter configured to convert the digital control amount into an analog control signal; and an output stage configured to supply a drive signal according to the analog control signal to the motor.

Arbitrary combinations of the above constituent elements and mutual replacement of the constituent elements and expressions among methods, devices, systems, etc. are also effective as embodiments of the present disclosure. Furthermore, the description in this section (SUMMARY) does not provide all the essential features of the present disclosure, and thus sub-combinations of those described features can also constitute the present disclosure.

BRIEF DESCRIPTION OF DRAWINGS

The accompanying drawings, which are incorporated in and constitute a part of the specification, illustrate embodiments of the present disclosure.

DETAILED DESCRIPTION

Figure 1:
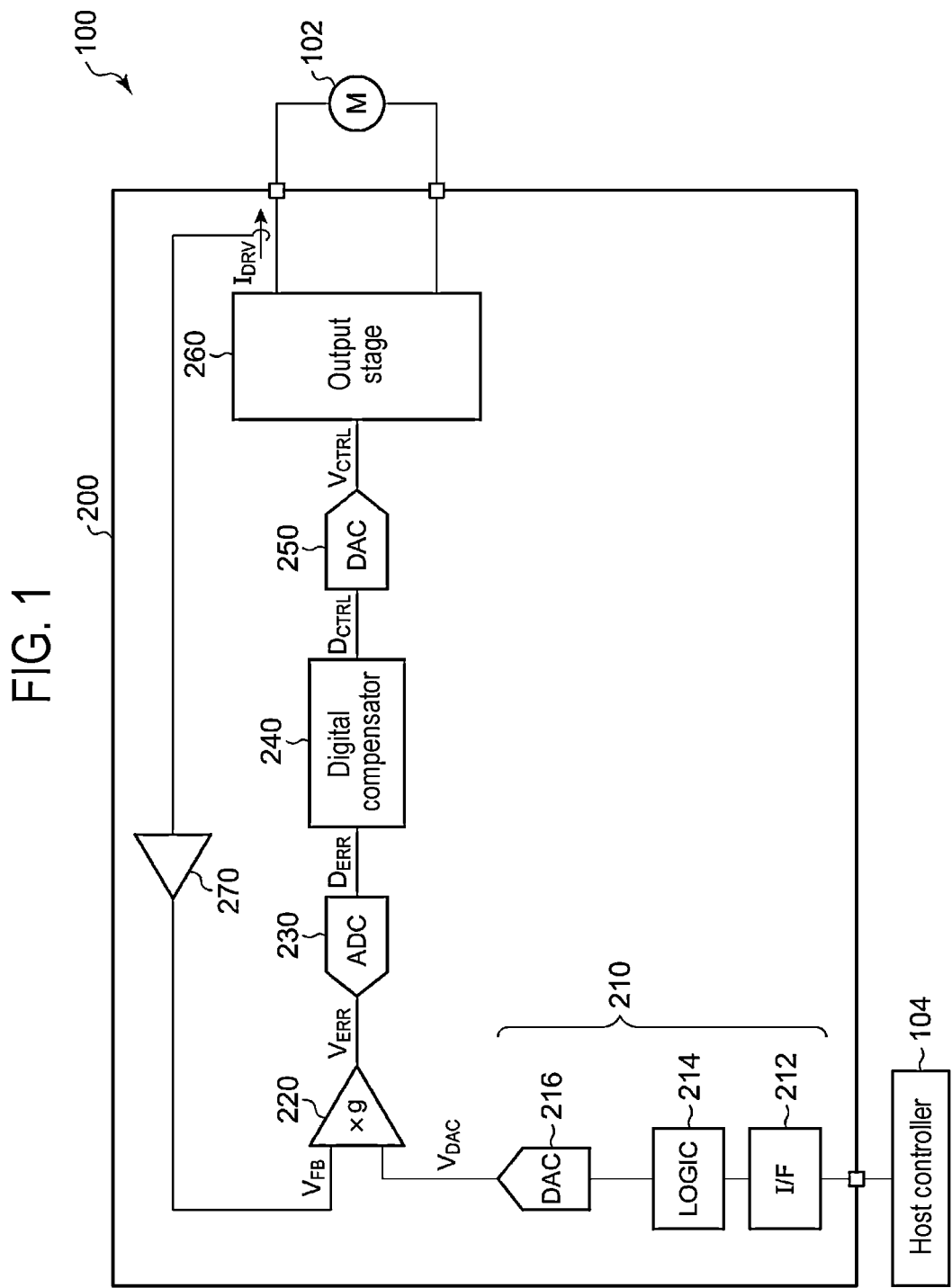
FIG. 1 is a block diagram of a positioning device including a motor driver circuit according to an embodiment.

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Overview of Embodiments

An overview of some exemplary embodiments of the present disclosure is described. This overview presents, as a prologue to the detailed description which will be presented later, some concepts of one or more embodiments in simplified forms for the purpose of basic understanding of the embodiments, but it is not intended to limit the scope of the disclosure. This summary is not a comprehensive overview of all possible embodiments, and it is intended to neither identify key elements of all embodiments nor delineate the scope of some or all aspects. For the sake of convenience, "an embodiment" may be used to refer to one embodiment (example or modification) or a plurality of embodiments (examples or modifications) disclosed herein.

A motor driver circuit according to an embodiment includes: an error detection amplifier configured to receive a current feedback signal $V_{FB}$ indicating a drive current of a motor and an analog command signal $V_{DAC}$ indicating a target amount of the drive current, and generate an analog error signal $V_{ERR}$ indicating an error between the drive current and the target amount of the drive current; an A/D converter configured to convert the analog error signal $V_{ERR}$ generated by the error detection amplifier into a digital error signal $D_{ERR}$; a digital compensator configured to generate a digital control amount based on the digital error signal $D_{ERR}$ output by the A/D converter; a D/A converter configured to convert the digital control amount into an analog control signal; and an output stage configured to supply a drive signal according to the analog control signal to the motor.

With this configuration, instead of the current feedback signal $V_{FB}$ indicating the drive current of the motor, the analog error signal $V_{ERR}$ that changes linearly with respect to the error between the drive current $I_{DRV}$ and the target amount $I_{REF}$ of the drive current $I_{DRV}$ is input to the A/D converter. In a state where a feedback loop is stabilized, since a current error $I_{REF}-I_{DRV}$ converges to near zero, a gain of the error detection amplifier can be set high. This makes it possible to employ an A/D converter with a low number of bits.

Further, the error detection amplifier should not be confused with an error amplifier used in an analog method. The error detection amplifier in the present disclosure is an amplifier having a gain of about several times or several tens of times and includes a feedback path of a direct current, whereas the analog error amplifier has a gain of theoretically infinite, actually several hundred to several thousands of times, and does not include a feedback path of a direct current. The analog error amplifier includes only a feedback path for phase compensation of an alternating current and differs in function and configuration from the error detection amplifier in the present disclosure.

In one embodiment, the motor driver circuit may further include: a sense resistor provided on a path of the drive current of the motor; and a current sense amplifier connected to the sense resistor and configured to generate a current feedback signal that changes linearly with respect to a current sense signal which is a voltage drop across the sense resistor.

In one embodiment, the current sense amplifier may include: a first operational amplifier; a first resistor connected between an inverting input of the first operational amplifier and one end of the sense resistor; a second resistor connected between the inverting input of the first operational amplifier and an output of the first operational amplifier; a third resistor connected between a non-inverting input of the first operational amplifier and the other end of the sense resistor; and a fourth resistor having one end configured to receive a predetermined level of voltage and the other end connected to the non-inverting input of the first operational amplifier.

In one embodiment, the error detection amplifier may include: a first input node configured to receive the current feedback signal; a second input node configured to receive the analog command signal; an output node; a second operational amplifier having an inverting input, a non-inverting input configured to receive a predetermined level of voltage, and an output; a fifth resistor connected between the inverting input of the second operational amplifier and the first input node; a sixth resistor connected between the inverting input of the second operational amplifier and the second input node; and a seventh resistor connected between the output of the second operational amplifier and the inverting input of the second operational amplifier.

In one embodiment, the error detection amplifier may further include: an eighth resistor connected between the output of the second operational amplifier and the output node; and a capacitor connected to the output node. The eighth resistor and the capacitor constitute an anti-alias filter for the A/D converter in a subsequent stage.

In one embodiment, the output stage may include: a first amplifier configured to amplify the analog control signal in a non-inverting manner; and a second amplifier configured to amplify the analog control signal in an inverting manner.

In one embodiment, the motor may be a linear motor. In one embodiment, the linear motor may be a voice coil motor.

In one embodiment, the motor driver circuit may be integrated on one semiconductor substrate. The term "integrated" is intended to include both of a case where all circuit elements are formed on a semiconductor substrate and a case where main elements of the circuit are integrated on the semiconductor substrate. In addition, some resistors, capacitors, and the like for adjusting a circuit constant may be provided outside the semiconductor substrate. By integrating the circuit on one chip, a circuit area can be reduced, and characteristics of the circuit elements can be kept uniform.

A positioning device according to an embodiment includes: a linear motor; and any one of the above-described motor driver circuits, wherein the motor driver circuit is configured to drive the linear motor.

A hard disk device according to an embodiment includes the above-described positioning device.

Embodiment

An embodiment will be now described with reference to the drawings. Like or equivalent components, members, and processes illustrated in each drawing are given like reference numerals and a repeated description thereof will be properly omitted. Further, the embodiment is presented by way of example only, and is not intended to limit the present disclosure, and any feature or combination thereof described in the embodiment may not necessarily be essential to the present disclosure.

In the present disclosure, "a state where a member A is connected to a member B" includes a case where the member A and the member B are physically and directly connected or even a case where the member A and the member B are indirectly connected through any other member that does not substantially affect an electrical connection state between the members A and B or does not impair functions and effects achieved by combinations of the members A and B.

Similarly, "a state where a member C is installed between a member A and a member B" includes a case where the member A and the member C or the member B and the member C are indirectly connected through any other member that does not substantially affect an electrical connection state between the members A and C or the members B and C or does not impair function and effects achieved by combinations of the members A and C or the members B and C, in addition to a case where the member A and the member C or the member B and the member C are directly connected.

In addition, the vertical and horizontal axes of a waveform diagram and a time chart shown in the present disclosure are enlarged or reduced as appropriate for ease of understanding, and each waveform shown is also simplified for ease of understanding.

FIG. 1 is a block diagram of a positioning device 100 having a motor driver circuit 200 according to an embodiment. The positioning device 100 includes a linear motor 102, a host controller 104, and the motor driver circuit 200.

The host controller 104 comprehensively controls the positioning device 100. The host controller 104 generates position control data POS indicating a target position of the linear motor 102 and transmits the position control data POS to the motor driver circuit 200. The host controller 104 is composed of, for example, a microcontroller, an FPGA (Field Programmable Gate Array), or an ASIC (Application Specific Integrated Circuit).

The motor driver circuit 200 receives the position control data POS and supplies a drive current $I_{DRV}$ of an amount corresponding to the position control data POS to the linear motor 102. The linear motor 102 is, for example, a voice coil motor and has a mover displaced by an amount corresponding to the drive current $I_{DRV}$ flowing through the linear motor 102.

Subsequently, a configuration of the motor driver circuit 200 will be described. The motor driver circuit 200 includes a current command generator 210, an error detection amplifier 220, an A/D converter 230, a digital compensator 240, a D/A converter 250, an output stage 260, and a current sense amplifier 270, and is a functional IC (Integrated Circuit) integrated on one semiconductor substrate.

The current command generator 210 generates an analog command signal $V_{DAC}$ indicating a target amount of the drive current $I_{DRV}$ supplied to the linear motor 102. For example, the current command generator 210 includes an interface circuit 212, a logic circuit 214, and a D/A converter 216. The interface circuit 212 is connected to the host controller 104 and receives control data. The interface circuit 212 may be, for example, an I2C (Inter IC) interface circuit or an SPI (Serial Peripheral Interface) circuit. For example, the control data from the interface circuit 212 includes a code indicating a target position of the mover of the linear motor 102. The logic circuit 214 outputs a control code based on the received code to the D/A converter 216. The control code may be the same as the code received from the host controller 104 or may be another code obtained by calculating the received code. The D/A converter 216 converts the control code generated by the logic circuit 214 into the analog command signal $V_{DAC}$.

The configuration of the current command generator 210 is not limited those described above, and the current command generator 210 may be configured to directly receive the analog command signal $V_{DAC}$ from the outside.

The current sense amplifier 270 generates a current feedback signal $V_{FB}$ indicating the drive current $I_{DRV}$ flowing through the linear motor 102. For example, the current feedback signal $V_{FB}$ is represented by the following equation, where k and $V_{CMREF}$ have arbitrary constant values.

$$V_{FB}=k \times I_{DRV}+V_{CMREF}$$

The error detection amplifier 220 receives the current feedback signal $V_{FB}$ and the analog command signal $V_{DAC}$ and generates an analog error signal $V_{ERR}$ indicating an error between the drive current $I_{DRV}$ and its target amount $I_{REF}$.

$$V_{ERR}=(I_{REF}-I_{DRV}) \times g, \text{ where } g \text{ is a finite gain.}$$

The A/D converter 230 converts the analog error signal $V_{ERR}$ generated by the error detection amplifier 220 into a digital error signal $D_{ERR}$.

The digital compensator 240 generates a digital control amount $D_{CTRL}$ based on the digital error signal $D_{ERR}$ output by the A/D converter 230. The digital compensator 240 includes a PI (Proportional-Integral) compensator or a PID (Proportional-Integral-Derivative) compensator. The PI compensator multiplies the digital error signal $D_{ERR}$ by a proportional gain $K_P$, multiplies an integral value of the digital error signal $D_{ERR}$ by an integral gain $K_I$, and adds them together to generate the digital control amount $D_{CTRL}$. The PID compensator multiplies the digital error signal $D_{ERR}$ by a proportional gain $K_P$, multiplies an integral value of the digital error signal $D_{ERR}$ by an integral gain $K_I$, multiplies a derivative value of the digital error signal $D_{ERR}$ by a derivative gain $K_D$, and adds them together to generate the digital control amount $D_{CTRL}$. The PI compensator and the PID compensator are also called a PI controller and a PID controller, respectively. The PI compensator and the PID compensator may be selected according to characteristics of an object to be controlled.

The D/A converter 250 converts the digital control amount $D_{CTRL}$ into an analog control signal $V_{CTRL}$.

The output stage 260 applies a drive signal to both ends of the linear motor 102 according to the analog control signal $V_{CTRL}$. The drive signal may be a voltage signal or a current signal.

Figure 2:
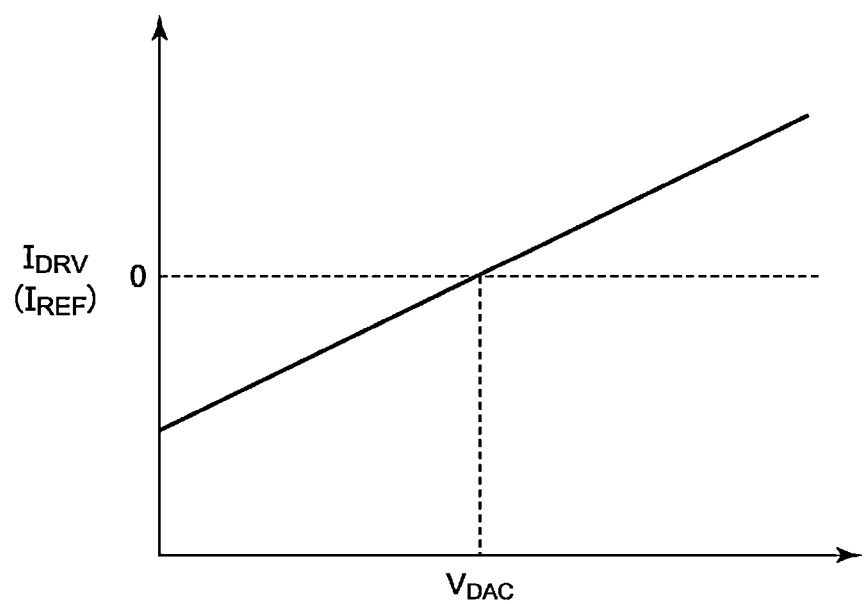
FIG. 2 is a diagram showing input and output characteristics of the motor driver circuit of FIG. 1.

The configuration of the positioning device 100 has been described above. Subsequently, an operation of the positioning device 100 will be described. FIG. 2 is a diagram showing input and output characteristics of the motor driver circuit 200 of FIG. 1. By the feedback control by the digital compensator 240, feedback works so that the error between the feedback signal $V_{FB}$ and the analog command signal $V_{DAC}$ approaches zero. Therefore, in a state where a feedback loop is stable, the following equation is established.

$$V_{FB}=k \times I_{DRV}+V_{CMREF}=V_{DAC}$$

In the steady state where the above equation is established, the drive current $I_{DRV}$ is stabilized at the target level $I_{REF}$ represented by the following equation.

$$I_{REF}=(V_{DAC}-V_{CMREF})/k$$

The operation of the motor driver circuit 200 has been described above. The motor driver circuit 200 does not require an analog phase compensation circuit as compared with an analog system, and therefore is easy to design.

Figure 3:
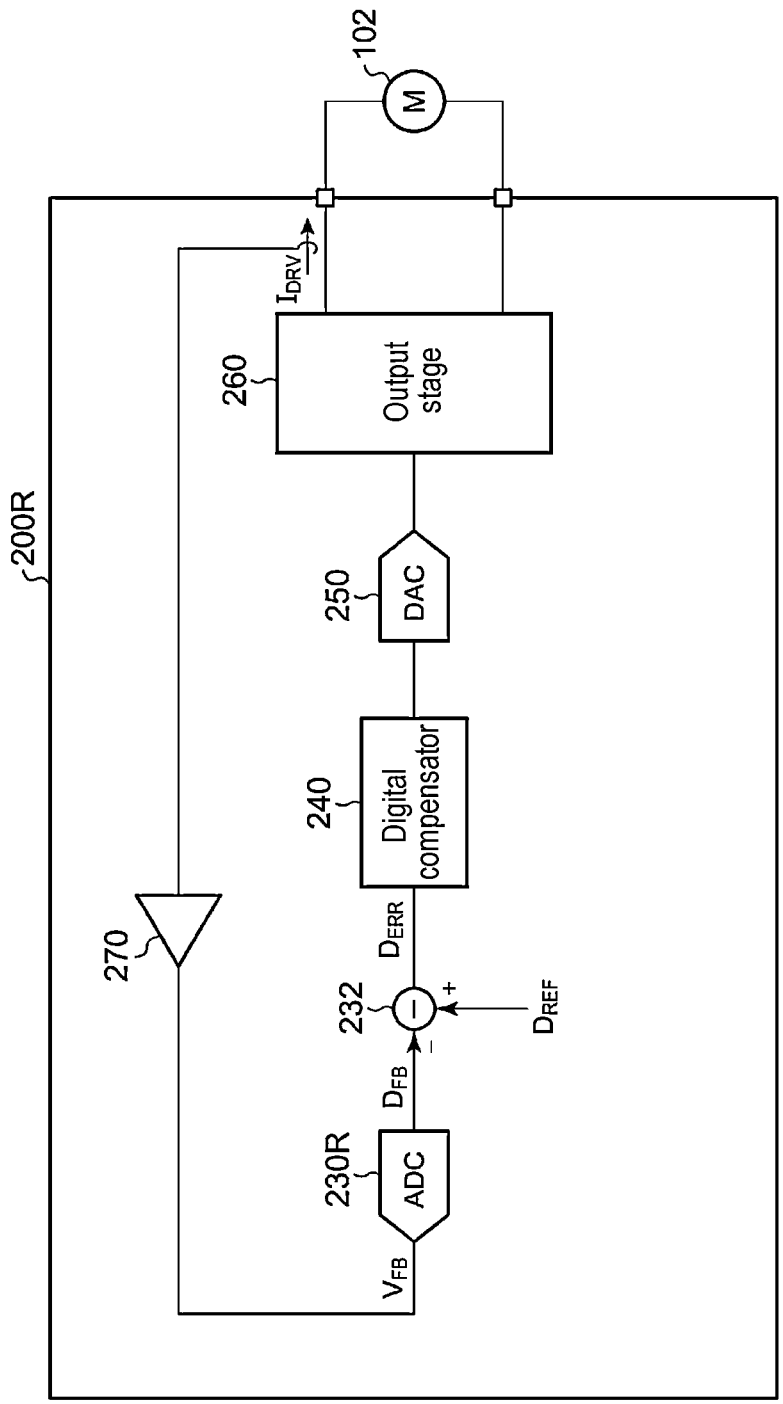
FIG. 3 is a block diagram of a motor driver circuit according to a comparative technique.

A further advantage of the motor driver circuit 200 becomes clear by comparison with a comparative technique. FIG. 3 is a block diagram of a motor driver circuit 200R according to a comparative technique. This motor driver circuit 200R is similar to that of the embodiment in that the motor driver circuit 200R is configured digitally but differs in the position of an A/D converter 230R. In the comparative technique, the A/D converter 230R converts the feedback signal $V_{FB}$ generated by the current sense amplifier 270 into a digital feedback signal $D_{FB}$. Thereafter, an error $D_{ERR}$ between the digital feedback signal $D_{FB}$ and a digital command value $D_{REF}$ is generated by a subtractor 232 functioning as an error detector.

Figure 4:
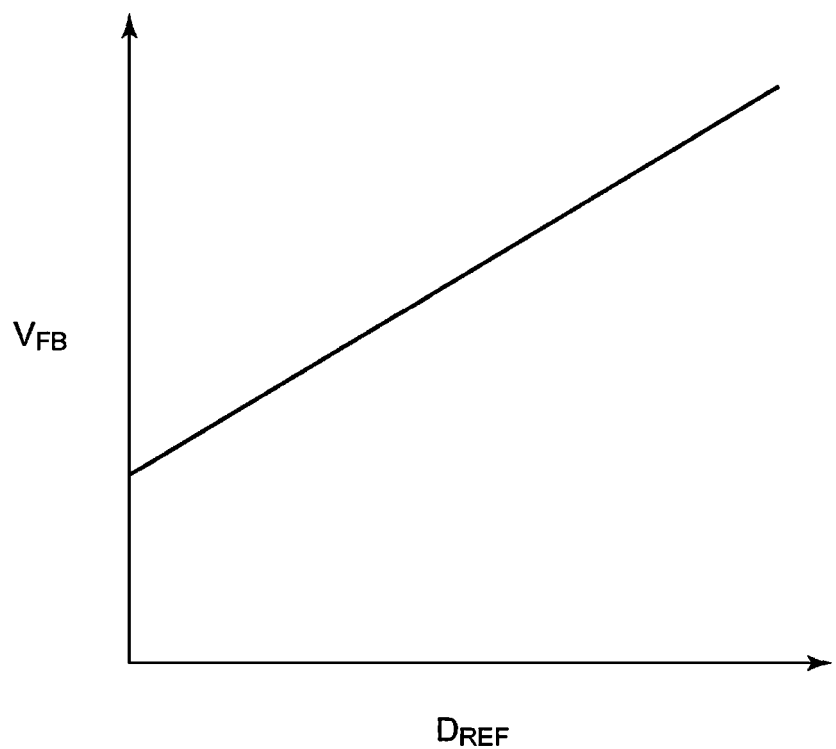
FIG. 4 is a diagram for explaining an operation of the motor driver circuit of FIG. 3.
Figure 4:
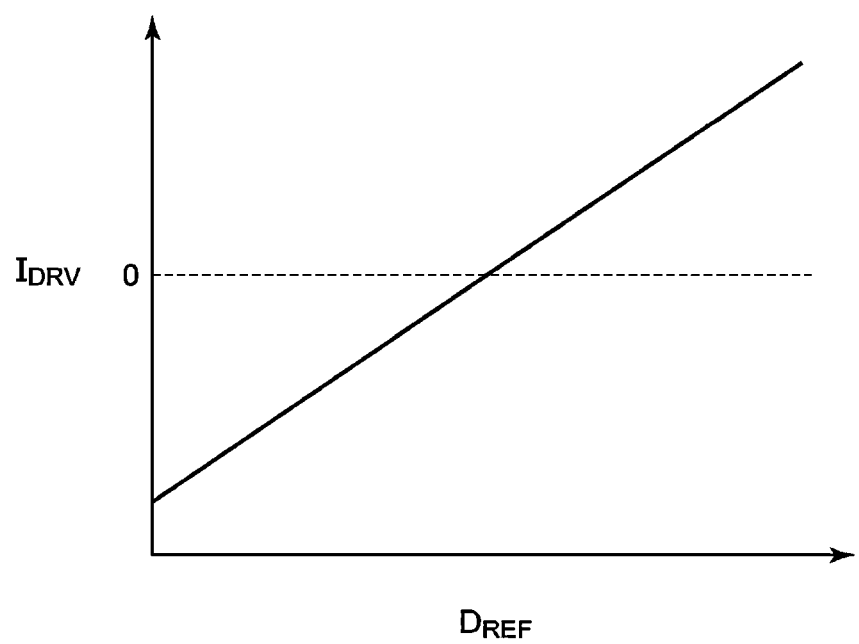

Attention is paid to the feedback signal $V_{FB}$ which is an input of the A/D converter 230R. Since the error $D_{ERR}$ is zero in a steady state where a feedback loop is stabilized, a relationship of $D_{REF}=D_{FB}$ is established. That is, when the digital command value $D_{REF}$ is changed, the feedback signal $V_{FB}$, which is the input of the A/D converter 230R, is changed so that a digital feedback signal $D_{FB}$ matching the changed digital command value $D_{REF}$ is generated. FIG. 4 is a diagram for explaining an operation of the motor driver circuit 200R of FIG. 3. In the comparative technique, the feedback signal $V_{FB}$ is changed over a wide range in response to a change in the digital command value $D_{REF}$. Therefore, it is necessary to select a high-bit A/D converter as the A/D converter 230R.

Advantages of the motor driver circuit 200 over this comparative technique will be described. Attention is paid to the input of the A/D converter 230 in the motor driver circuit 200 of FIG. 1. The input of the A/D converter 230 is the analog error signal $V_{ERR}$. In the steady state where the feedback loop is stabilized, the analog error signal $V_{ERR}$ is substantially zero regardless of the target level $I_{REF}$ of the drive current $I_{DRV}$, that is, regardless of a magnitude of the analog command signal $V_{DAC}$. Therefore, a variation range of the input voltage of the A/D converter 230 is narrower than that in the comparative technique. This allows the A/D converter 230 to adopt a lower bit A/D converter than the A/D converter 230R in the comparative technique. By reducing the number of bits of the A/D converter 230, a chip cost and power consumption of the motor driver circuit 200 can be reduced.

In addition, in the motor driver circuit 200, a gain of the error detection amplifier 220 can be increased. The reason is because, regardless of the gain, in the steady state, the error detection signal $V_{ERR}$, that is, the input of the A/D converter 230, has a voltage level corresponding to zero. Increasing the gain of the error detection amplifier 220 produces the same effect as increasing the number of bits (resolution) of the A/D converter 230. Therefore, the motor driver circuit 200 can reduce the number of bits of the A/D converter 230 for this reason as well.

For example, when the comparative technique requires a 16-bit A/D converter 230R, the number of bits of the A/D converter 230 can be reduced to 12 bits in the present embodiment. A SAR (Successive Approximation) DAC can be used as the low-bit A/D converter 230, but other forms may be employed.

Figure 5:
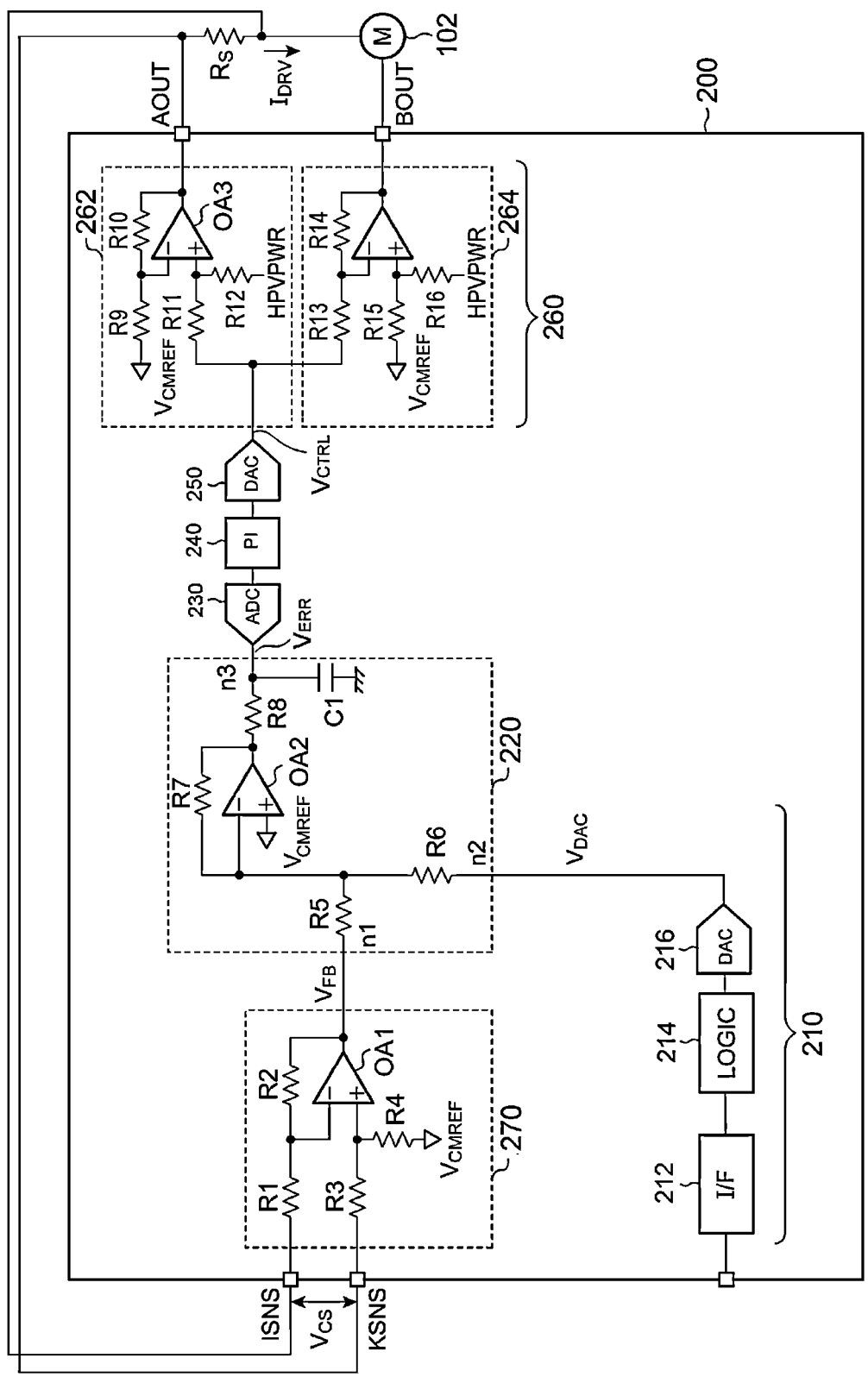
FIG. 5 is a circuit diagram showing a configuration example of a motor driver circuit.

FIG. 5 is a circuit diagram showing a configuration example of the motor driver circuit 200. The linear motor 102 and a current sense resistor $R_S$ are connected in series between output pins AOUT and BOUT of the motor driver circuit 200. A voltage drop proportional to the drive current $I_{DRV}$ occurs across the current sense resistor $R_S$. The voltage drop across the current sense resistor $R_S$ is fed back as a current detection signal $V_{CS}$ between current sense pins ISNS and KSNS of the motor driver circuit 200.

$$V_{CS}=R_S \times I_{DRV}$$

The current sense amplifier 270 generates the feedback signal $V_{FB}$, which changes linearly with respect to the current detection signal $V_{CS}$ and becomes a predetermined level $V_{CMREF}$ when $V_{CS}=0$ (that is, $I_{DRV}=0$).

The current sense amplifier 270 includes a first operational amplifier OA1, a first resistor R1, a second resistor R2, a third resistor R3, and a fourth resistor R4.

The first resistor R1 is connected between an inverting input (−) of the first operational amplifier OA1 and one end (INS pin) of the sense resistor $R_S$. The second resistor R2 is connected between the inverting input (−) of the first operational amplifier OA1 and an output of the first operational amplifier OA1. The third resistor R3 is connected between a non-inverting input (+) of the first operational amplifier OA1 and the other end (KSNS pin) of the sense resistor $R_S$. The fourth resistor R4 has one end that receives a predetermined level of voltage $V_{CMREF}$, and the other end connected to the non-inverting input (+) of the first operational amplifier OA1. The feedback signal $V_{FB}$ corresponds to an output voltage of the first operational amplifier OA1.

When a relationship of R1=R3 and R2=R4 is established, the following equation is established.

$$V_{FB}=R2/R1 \times V_{CS}+V_{CMREF}$$

The error detection amplifier 220 includes a first input node n1, a second input node n2, an output node n3, a second operational amplifier OA2, a fifth resistor R5, a sixth resistor R6, a seventh resistor R7, an eighth resistor R8, and a capacitor C1. The feedback signal $V_{FB}$ is input to the first input node n1, and the analog command signal $V_{DAC}$ is input to the second input node n2.

The second operational amplifier OA2, the fifth resistor R5, the sixth resistor R6, and the seventh resistor R7 constitute an adder circuit. The second operational amplifier OA2 receives a reference voltage $V_{CMREF}$ at a non-inverting input (+) thereof. The fifth resistor R5 is connected between an inverting input (−) of the second operational amplifier OA2 and the first input node n1. The sixth resistor R6 is connected between the inverting input (−) of the second operational amplifier OA2 and the second input node n2. A voltage command signal $V_{EAOUT}$ may correspond to an output voltage of the second operational amplifier OA2. The seventh resistor R7 is connected between the inverting input (−) and an output of the second operational amplifier OA2.

A gain g of the adder circuit with respect to the feedback voltage $V_{FB}$ is R7/R5.

The eighth resistor R8 is connected between the output of the second operational amplifier OA2 and the output node n3 of the error detection amplifier 220. The capacitor C1 is connected to the output node n3. The eighth resistor R8 and the capacitor C1 constitute a low-pass filter. This low-pass filter functions as an anti-alias filter for the A/D converter 230 in a subsequent stage.

The output stage 260 includes a first amplifier 262 and a second amplifier 264. The first amplifier 262 amplifies the analog control signal $V_{CTRL}$ in a non-inverting manner. The second amplifier 264 amplifies the analog control signal $V_{CTRL}$ in an inverting manner.

The first amplifier 262 includes a third operational amplifier OA3 and ninth to twelfth resistors R9 to R12. A configuration of the first amplifier 262 is similar to that of the current sense amplifier 270. When a relationship of R9=R11 and R10=R12 is established, an output voltage $V_{AOUT}$ of the first amplifier 262 is represented by the following equation.

$$V_{AOUT}=R10/R9 \times (V_{CTRL}-V_{CMREF})+HVPWR$$

The second amplifier 264 includes a fourth operational amplifier OA4 and thirteenth to sixteenth resistors R13 to R16. A configuration of the second amplifier 264 is similar to those of the current sense amplifier 270 and the first amplifier 262. When a relationship of R13=R15 and R14=R16 is satisfied, an output voltage $V_{BOUT}$ of the second amplifier 264 is represented by the following equation.

$$V_{BOUT}=R14/R13 \times (V_{CTRL}-V_{CMREF})+HVPWR$$

In addition, a relationship of R10/R9=R14/R13 is satisfied.

The configuration of the motor driver circuit 200 has been described above. According to this motor driver circuit 200, the number of bits of the A/D converter 230 can be reduced.

Application

Figure 6:
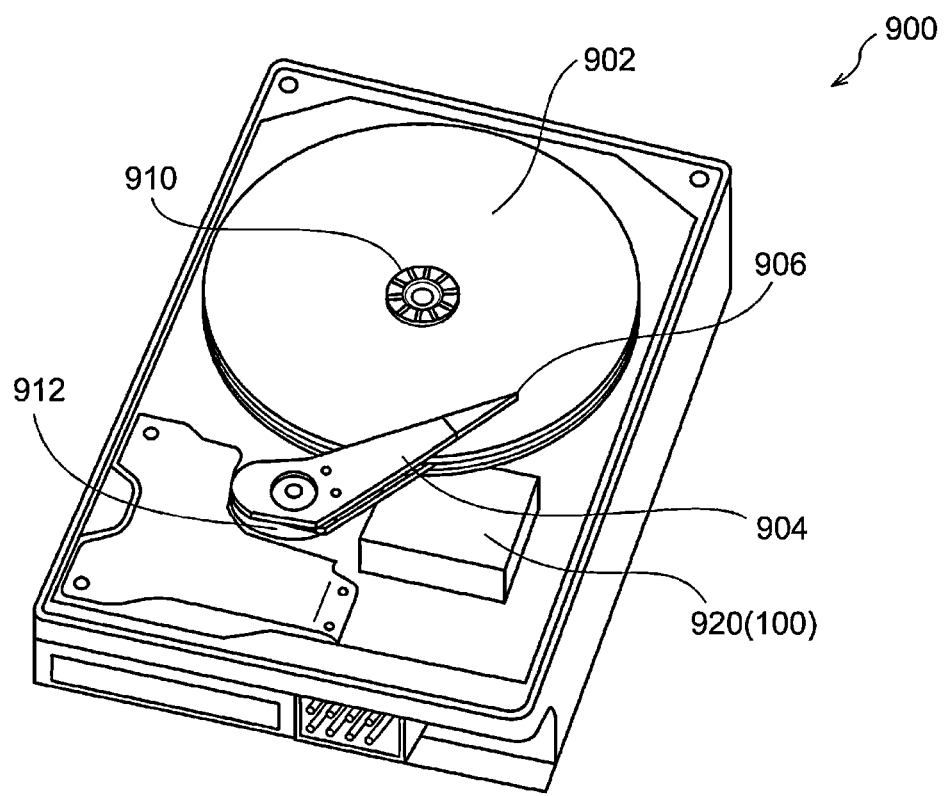
FIG. 6 is a view showing a hard disk device including a motor driver circuit.

FIG. 6 is a view showing a hard disk device 900 including the motor driver circuit 200. The hard disk drive 900 includes a platter 902, a swing arm 904, a head 906, a spindle motor 910, a seek motor 912, and a motor driver circuit 920. The motor driver circuit 920 drives the spindle motor 910 and the seek motor 912.

The seek motor 912 is a voice coil motor. The motor driver circuit 200 (or 200A) according to the embodiment is incorporated in the motor driver circuit 920 and drives the seek motor 912.

The seek motor 912 positions the head 906 via the swing arm 904. Low noise is required during a read and write period of a hard disk, that is, when the head 906 is located in a particular region. Therefore, it is possible to automatically suppress noise during the read and write period by defining $x_a$ and $x_b$ of the seek motor 912 so that: (i) the seek motor 912 is in a first state φ1 when the seek motor 912 is positioned to locate the head 906 in an effective region on the platter 902; and (ii) the seek motor 912 is in a second state φ2 when the seek motor 912 is positioned to locate the head 906 in the other regions.

In the present disclosure, the configuration and type of the linear motor as an object to be driven are not particularly limited. For example, the present disclosure can be applied to drive a spring return type voice coil motor and other linear actuators. Alternatively, the motor as an object to be driven may be a spindle motor.

In addition, the application of the positioning device 100 is not limited to hard disk devices and can also be applied to a lens positioning mechanism of a camera and the like.

According to the present disclosure in some embodiments, it is possible to employ a low-bit A/D converter as a motor driver circuit.

While certain embodiments have been described, these embodiments have been presented by way of example only and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A motor driver circuit comprising:
  a current command generator configured to generate an analog command signal indicating a target amount of a drive current to be supplied to a motor as an object to be driven;
  an error detection amplifier configured to receive a current feedback signal indicating a drive current being supplied to the motor and the analog command signal, and generate an analog error signal indicating an error between the drive current being supplied to the motor and the target amount of the drive current to be supplied to the motor;
  an A/D converter configured to convert the analog error signal generated by the error detection amplifier into a digital error signal;
  a digital compensator configured to generate a digital control amount based on the digital error signal output by the A/D converter;
  a D/A converter configured to convert the digital control amount into an analog control signal; and
  an output stage configured to supply a drive signal according to the analog control signal to the motor.

2. The motor driver circuit of claim 1, further comprising:
  a sense resistor provided on a path of the drive current being supplied to the motor; and
  a current sense amplifier connected to the sense resistor and configured to generate the current feedback signal that changes linearly with respect to a current sense signal which is a voltage drop across the sense resistor.

3. The motor driver circuit of claim 2, wherein the current sense amplifier includes:
  a first operational amplifier;
  a first resistor connected between an inverting input of the first operational amplifier and one end of the sense resistor;
  a second resistor connected between the inverting input of the first operational amplifier and an output of the first operational amplifier;
  a third resistor connected between a non-inverting input of the first operational amplifier and the other end of the sense resistor; and
  a fourth resistor having one end configured to receive a predetermined level of voltage and the other end connected to the non-inverting input of the first operational amplifier.

4. The motor driver circuit of claim 1, wherein the error detection amplifier includes:
  a first input node configured to receive the current feedback signal;
  a second input node configured to receive the analog command signal;
  an output node;
  a second operational amplifier having an inverting input, a non-inverting input configured to receive a predetermined level of voltage, and an output;
  a fifth resistor connected between the inverting input of the second operational amplifier and the first input node;
  a sixth resistor connected between the inverting input of the second operational amplifier and the second input node; and
  a seventh resistor connected between the output of the second operational amplifier and the inverting input of the second operational amplifier.

5. The motor driver circuit of claim 4, wherein the error detection amplifier further includes:
  an eighth resistor connected between the output of the second operational amplifier and the output node; and
  a capacitor connected to the output node.

6. The motor driver circuit of claim 1, wherein the output stage includes:
  a first amplifier configured to amplify the analog control signal in a non-inverting manner; and
  a second amplifier configured to amplify the analog control signal in an inverting manner.

7. The motor driver circuit of claim 1, wherein the motor is a linear motor.

8. The motor driver circuit of claim 7, wherein the linear motor is a voice coil motor.

9. The motor driver circuit of claim 1, wherein the motor driver circuit is integrated on one semiconductor substrate.

10. A positioning device comprising:
  a linear motor; and
  the motor driver circuit of claim 1, wherein the motor driver circuit is configured to drive the linear motor.

11. A hard disk device comprising the positioning device of claim 10.

* * * * *